A. KINGSBURY.
THRUST BEARING.
APPLICATION FILED FEB. 26, 1916.

1,260,548.

Patented Mar. 26, 1918.
2 SHEETS—SHEET 1.

INVENTOR
Albert Kingsbury
BY
ATTORNEY

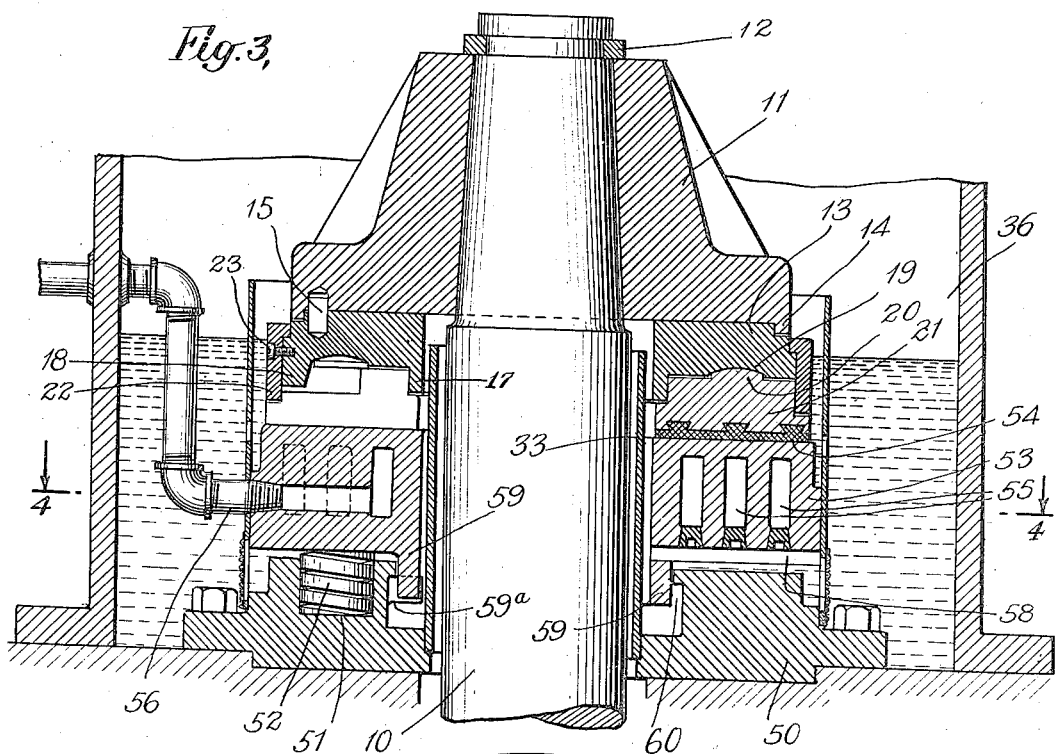
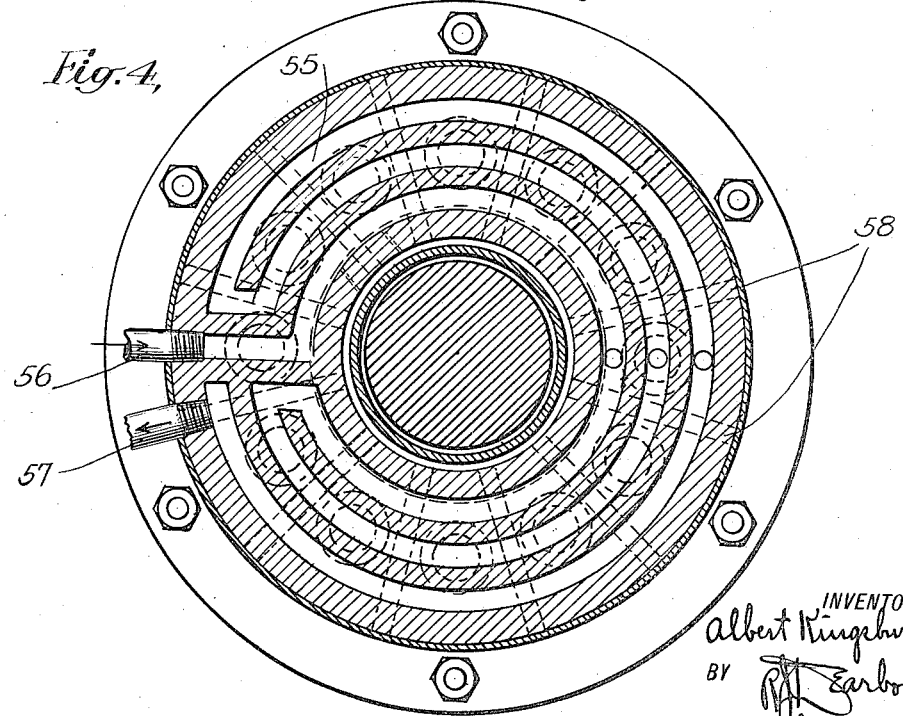

UNITED STATES PATENT OFFICE.

ALBERT KINGSBURY, OF PITTSBURGH, PENNSYLVANIA.

THRUST-BEARING.

1,260,548.  Specification of Letters Patent.  Patented Mar. 26, 1918.

Application filed February 26, 1916. Serial No. 80,568.

*To all whom it may concern:*

Be it known that I, ALBERT KINGSBURY, a citizen of the United States, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to thrust bearings and has special reference to such as comprise a plurality of tiltably mounted shoes and are adapted to sustain relatively high thrust pressures.

One object of my invention is to provide a simple and effective bearing structure in which the shoes are connected to move with the rotating part of the bearing without interfering with their normal individual tilting action.

Another object of my invention is to provide a thrust collar which is particularly arranged and constructed so that it may be formed advantageously of such metals as forged steel or copper and which shall embody means for permitting the circulation of cooling fluid through it to prevent the overheating of the bearing surfaces.

Still another object is to provide a bearing member that shall be adapted to be cooled so as to effectively cool the thin film of oil which is maintained at its surface, and which furthermore shall be provided with passages for the lubricating fluid, so arranged that the bearing member also constitutes a means for cooling the lubricating fluid just prior to entering the bearing.

Another object of my invention is to provide a thrust bearing embodying means for cooling one of the bearing members, means for restricting, guiding and utilizing the circulation of lubricating fluid centrifugally produced by the rotating parts of the bearing, so that a continuous circuit or endless path for the fluid is established from the bearing surfaces through a screen or filter, and through cooling passages in the bearing member back to the bearing surfaces.

Other objects and advantages of my invention will be set forth hereinafter, and in order that my invention may be thoroughly understood I will now proceed to describe the same in the following specification and then point out the novel features thereof in appended claims.

Referring to the drawings:

Fig. 3 is a view corresponding to Fig. 1, of a modified bearing structure which also embodies my invention.

Fig. 4 is a sectional plan view taken on the line 4—4 of Fig. 3.

Figure 1:
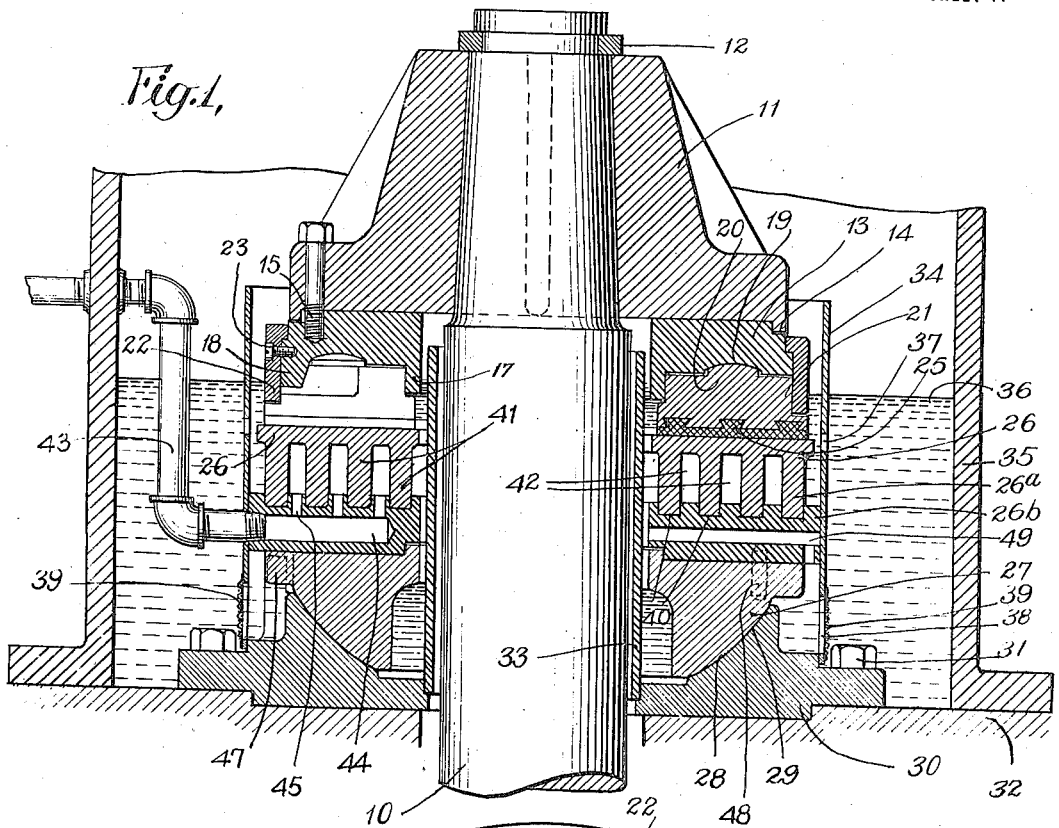
Figure 1 is a sectional elevation of a bearing arranged and constructed in accordance with my invention, the view being taken on the line 1—1 of Fig. 2.
Figure 2:
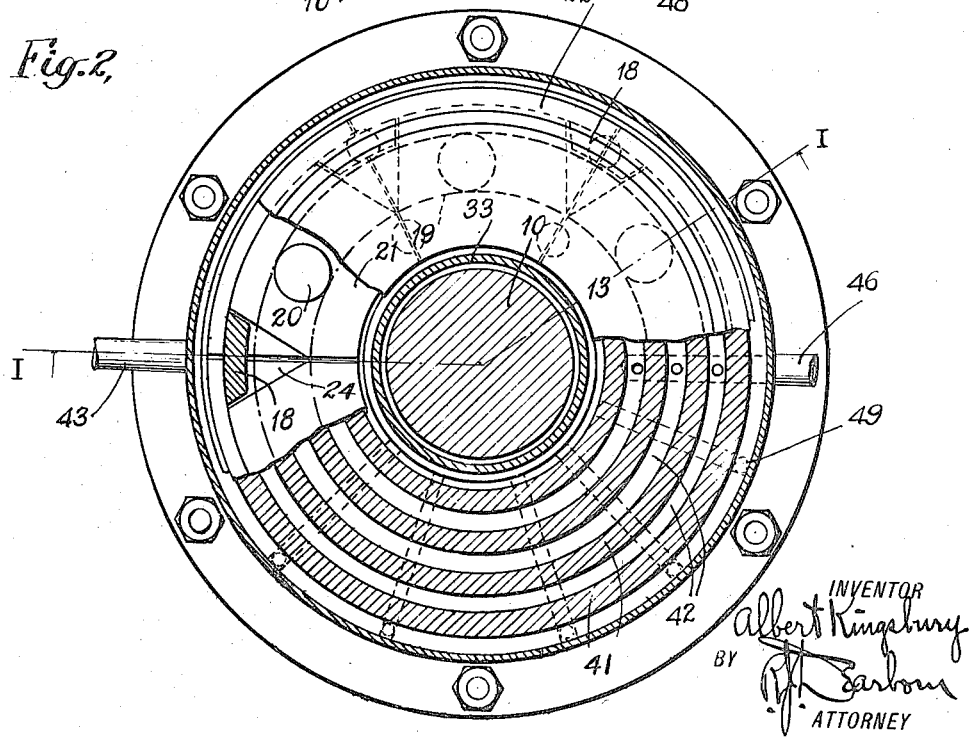
Fig. 2 is a plan view of the same bearing with certain of the parts broken away to disclose the arrangement of the bearing shoes and the structure of the water-cooled bearing member.

In the structures shown in Figs. 1 and 2, to which special reference may first be had, a vertical shaft 10 has a thrust block 11 at its upper end which is held in position by a ring key 12. An annular shoe plate 13 is mounted upon the bottom surface of the thrust block 11 and is held in position by a flange 14 thereof, independent rotation of the shoe plate being prevented by one or more bolts 15. As shown in Fig. 3, dowel pins may be used instead of the bolts but I consider that bolts are preferable because they hold the plate 13 against the collar 11 when assembling the bearing or taking it apart.

The shoe plate has an inner flange 17 which is spaced slightly from the shaft 10 and a plurality of downwardly extending lugs 18 uniformly spaced about its outer periphery. Furthermore, the shoe plate has a plurality of spherically curved sockets, or an annular groove 19, as shown, which coöperates with spherically curved buttons or projections 20 forming parts of the radial bearing shoes 21. By raising the shaft an amount equal to the depth of groove 19 and taking the load off the shoes, the latter may be removed radially if ring 22 be lifted.

The bearing shoes are fitted loosely between the flange 17 and a ring 22 which is attached to the shoe plate by screws 23 or some other suitable means.

The shoes 21, as clearly indicated in Fig. 2, are sectors or radial members and are fitted around the flange 17 close to each other. Their corners, however, are cut off to provide V-shaped spaces 24 into which the lugs 18 extend. The lugs thus constitute means for causing the shoes to rotate with the shoe plate which is, as above indicated, driven by the bearing block 11 when the shaft 10 is rotating.

Each of the shoes is preferably provided with a facing 25 of Babbitt or other suitable bearing metal.

The shoes coöperate with a relatively stationary bearing ring 26 which is composed of two parts 26$^a$ and 26$^b$, and is mounted on a leveling ring 27 having a spherically curved surface 28. The leveling ring is seated upon a spherically curved annular surface 29 of a stationary support 30.

The stationary support is bolted as indicated at 31 or otherwise secured to a base 32, and leveling ring 27 is adapted to assume such a position with reference to the support as to equalize the pressure sustained by the bearing upon the several shoes.

Secured to the support 30 and closely surrounding the shaft without interfering with its rotation, is a sleeve 33 which coöperates with a housing 35 in providing an annular oil pocket 36.

The oil pocket is filled with lubricating fluid to a sufficient level to immerse the bearing members and the barrier 34 is provided slightly below the surface of the lubricating fluid with holes or ports 37 and near the bottom of the plate having filters or screens 39.

The structure of the bearing ring 26 will now be described more in detail. The part 26$^b$ has the form of a flat ring with a plurality of annular grooves 40 in its upper surface and the part 26$^a$ has a plurality of annular projections 41 formed by grooves in its bottom surface, the ends of the projections being fitted into the grooves 40 of the part 26$^b$. The arrangement is such that a plurality of annular passages 42 are provided in the bearing member 26 through which water or other suitable cooling fluid is circulated. The parts 26$^a$ and 26$^b$ are preferably press-fitted together so that they act as an integral unit.

The water enters through an inlet pipe 43 which is tapped into a radial hole 44 in the part 26$^b$. A plurality of small passages 45 establish communication between the radial hole 44 and the annular passages 42.

On the opposite side of the member 26$^b$ is an outlet 46 which is similarly arranged and connected to the passages 42 as indicated in Fig. 2.

The stationary support 30 has an upwardly extending lug 47 which engages a notch in the leveling ring 27. In this way the leveling ring 27 is free to seat itself but is held against rotation. The bearing ring 26 is prevented from rotation by dowel pins 48 which connect it to the leveling ring 27. The part 26$^b$ of the bearing ring has a number of radial passages 49 for the lubricating fluid.

Since the shoes 21 are universally pivoted, i. e. free to tilt not only tangentially to establish the automatic oil film, but also radially they are adapted to coöperate in a special manner with the universally supported bearing member 26 which in this modification is mounted on the equalizing ring 27. The advantages of this combination are particularly apparent in case the shaft becomes bent slightly so that it runs out of true; with the universally pivoted shoes the equalizing ring is relieved of considerable movement and consequent wear and the friction of the bearing as a whole under such conditions is reduced.

Before describing the modification of Figs. 3 and 4, I will describe briefly the operation of the bearing of Figs. 1 and 2. When the bearing is in operation the bearing shoes 21 assume slightly tilted positions, the oil or other lubricating fluid in which the bearing surfaces are immersed, being drawn in or wedged between the surfaces. At the same time a quantity of oil is carried in the spaces between shoes and is thrown out in a radial direction, on account of the centrifugal action. The oil from the bearing flows through the ports 37, more oil being taken into the bearing from the space close to the hollow cylindrical or tubular member 33. This action causes a circulation of oil and the oil flows from the relatively large volume in the chamber 36, inwardly through the screens or filters 39 in the ports 38 and through the cooling passages 49, then outwardly through the bearing surfaces and between the bearing shoes as already explained.

As clearly illustrated in Fig. 1 the outlet passage for the oil from the bearing surfaces is restricted by the lugs 18, by the ring 22 and by the perforated sleeve 34. This restriction is important because the centrifugal action of the rotating parts is liable otherwise to throw the oil outward too rapidly and cause the bearing to run dry. This tendency is much greater with an arrangement as shown in which the shoes are carried by the rotating member and the restricted outward passage is desirable in combination therewith.

The lubricating oil film between the surfaces of the ring 26 and the coöperating bearing surfaces of the shoes is very thin and is easily cooled; consequently the cooling of the ring itself is particularly effective in preventing excessive temperatures either in the shoes or in the oil.

The restriction to the flow of oil as above described coöperates in an important manner with the cooling of the ring 26 since the oil is held for a longer period in contact with the ring and hence is more effectively cooled.

The bearing members divide the oil reservoir into what may be conveniently termed an inner oil chamber and an outer oil chamber, which are connected by the passages 49 below the bearing member 26.

Attention is directed to the fact that the oil circulation is continuously maintained when the bearing is in operation in an annular path which is continuous and includes within it the cooled bearing ring 26.

The bearing ring 26, together with the leveling ring 27 on which it is mounted, automatically adjust themselves on the seat provided by the stationary support 30, so as to equalize the pressure upon the several shoes.

The modification of Figs. 3 and 4 to which special reference may now be had, is similar as far as the rotating part of the device is concerned, to the structure of Figs. 1 and 2 and corresponding parts are designated by the same reference characters. A stationary support 50 replaces the support 30 and is provided with a plurality of cyindrical pockets 51 in which are disposed helical springs 52.

A bearing ring 53, which corresponds to the ring 26 of Figs. 1 and 2, is mounted on the springs 52 and has a plane annular surface 54 which coöperates with the bearing surfaces of the shoes 21.

The ring 53 is cored to provide a tortuous passage 55 through which water or other cooling fluid may circulate, the inlet being indicated at 56 and the outlet at 57.

The bearing ring 53 is provided with slots 58 which constitute passages for lubricating fluid and correspond to the passages 49 of the previous figures.

Extending downwardly from the ring 53 is an annular projection 59 which centers the ring relative to the base 50. A lug 59ª extends inwardly from the base 50 and coöperates with a suitable notch in the annular projection 59 so as to hold the ring against rotation.

The spring 52 may be replaced by any suitable yielding resilient support which permits the ring to continually adjust itself to the surfaces of the shoes as they rotate and thus at all times distributes the thrust pressure upon the several shoes with substantial uniformity.

My invention is not limited to the structures illustrated, or modifications thereof, and evidently may be embodied in various other mechanisms.

What I claim is:

1. A thrust bearing comprising a ring-shaped shoe plate having an annular groove and a plurality of spaced lugs, and a plurality of shoes tiltingly mounted in the groove of the shoe plate with the lugs extending between the shoes.

2. A thrust bearing comprising a shoe plate having a plurality of spaced lugs extending from its supporting surface, a plurality of shoes having their corners so shaped as to provide notches between them, and tiltingly mounted on the shoe plate with the lugs extending into said notches.

3. A thrust bearing comprising a shoe plate having a plurality of spaced lugs constituting a sectional flange, a plurality of shoes having their corners cut to provide V-shaped notches between them and tiltingly mounted on the shoe plate with the lugs or flange segments extending into the V-shaped notches.

4. A thrust bearing comprising a rotatable annular shoe plate having a plurality of spaced lugs near its outer edge, a plurality of shoes tiltingly mounted on the shoe plate with the lugs extending between the shoes, and means attached to the shoe plate for holding the shoes in position against centrifugal action.

5. A thrust bearing comprising a rotatable annular shoe plate having a plurality of spaced lugs near its outer edge, a plurality of shoes tiltingly mounted on the shoe plate with the lugs extending between the shoes, and a removable flange secured to the annular shoe plate and encircling the shoes to hold the shoes in position against centrifugal action.

6. A thrust bearing comprising a bearing ring having passages for cooling fluid extending in one way, and lubricating fluid passages extending through the ring in another direction close to the cooling passages.

7. A thrust bearing comprising a bearing ring containing a passage for cooling fluid and a passage for the lubricant and a coöperating bearing member.

8. A thrust bearing comprising a bearing ring having circumferentially extending cooling passages, and radial passages for the lubricating fluid.

9. A thrust bearing comprising a bearing ring having circumferentially extending cooling passages and radial lubricating fluid passages, and an annular surface, a rotatable member and a plurality of bearing shoes tiltingly mounted on the rotatable member and coöperating with the bearing surface of the ring.

10. A thrust bearing comprising a stationary support, a leveling ring tiltingly mounted on the support, a bearing ring mounted on the leveling ring and having a plurality of passages for cooling fluid and a plurality of passages for lubricating fluid, and tiltably supported bearing shoes rotatable with the shaft, coöperating with the bearing surface of the ring.

11. A thrust bearing comprising a fluid containing chamber, a baffle partition in the chamber, a bearing member in the chamber on one side of the partition having a passage for cooling fluid, a rotatable member, a plurality of bearing shoes tiltingly mounted thereon and coöperating with the stationary bearing member, an outlet port in the partition opposite the bearing surfaces, a screened inlet port in the partition, and a lubricating fluid passage in the stationary bearing member adapted to receive lubricating fluid through the screened inlet port, said bearing in operation being adapted to discharge oil through the outlet port.

12. A thrust bearing comprising a fluid containing chamber, a baffle partition in the chamber, a bearing ring in the chamber on one side of the partition having a cooling passage and a lubricating fluid passage, a rotatable member, a plurality of bearing shoes tiltingly mounted thereon and coöperating with the stationary bearing ring, an outlet port in the partition opposite the bearing surface, and a screened inlet port in the partition below the bearing ring adapted to supply oil to the lubricating passages of the ring.

13. A thrust bearing comprising an annular fluid containing chamber, a tubular baffle in the chamber, a bearing ring in the chamber within the baffle plate and having a cooling passage, a rotatable member, a plurality of bearing shoes tiltingly mounted thereon and coöperating with the bearing surface, a screened inlet port in the baffle plate below the bearing ring, and a plurality of radial lubricating fluid passages in the ring adapted to receive lubricating fluid from the inlet port.

14. A thrust bearing comprising a thrust collar composed of a ring having a plurality of relatively shallow annular grooves, a second ring having a plurality of annular projections fitted into the grooves of the first ring and producing a series of annular passages, and means for establishing a circulation of cooling fluid through the passages.

15. A thrust bearing comprising a thrust collar composed of a ring having a plurality of relatively shallow annular grooves, a second ring having a plurality of annular projections fitted into the grooves of the first ring and producing a series of annular passages, and inlet and exhaust passages communicating with said annular passages and providing for the circulation of cooling fluid therethrough.

16. A thrust bearing comprising a thrust collar composed of a ring having a plurality of relatively shallow annular grooves, a second ring having a plurality of annular projections fitted into the grooves of the first ring and producing a series of annular passages, and means for establishing a circulation of cooling fluid through the passages, one of said rings being provided with passages for lubricating fluid.

17. A thrust bearing comprising a thrust collar composed of a ring having a plurality of relatively shallow annular grooves, a second ring having a plurality of annular projections fitted into the grooves of the first ring and producing a series of annular passages, and means for establishing a circulation of cooling fluid through the passages, one of said rings being provided with passages for lubricating fluid.

18. In a thrust bearing the combination of two relatively rotatable members, a plurality of bearing shoes tiltably mounted on one of said members, an equalizing support for the other of said members, an annular oil chamber inclosing the bearing members and extending above the level of the bearing surfaces, and means for establishing and maintaining a continuous circulation of oil outwardly through the bearing surfaces and inwardly through passageways below the level of said surface when the bearing is running.

19. In a thrust bearing the combination of two relatively rotatable members, a plurality of bearing shoes tiltably mounted on one of said members, a support for the other of said members having radial passages below the bearing surfaces, and means for establishing and maintaining a continuous circulation of oil outwardly through the bearing surfaces and inwardly through said passages.

20. The combination of an oil well, a bearing ring dividing said well into annular chambers, a passageway connecting the chambers, and a screen interposed in said passageway.

21. In a thrust bearing the combination of an oil well containing the bearing and a bearing ring dividing the oil well into inner and outer chambers and provided with passageways connecting said chambers.

22. A thrust bearing comprising a shoe plate provided with a plurality of projecting lugs and a plurality of shoes engaged by the said lugs and supported on the shoe plate in such manner as to be capable of tilting in all directions.

23. In a thrust bearing the combination of a shoe plate provided with a circumferentially arranged series of projecting lugs and a corresponding series of bearing shoes engaged by the said lugs and supported on the plate in such manner as to permit of universal tilting movement of the shoes.

24. In a thrust bearing the combination of a shoe supporting member having a plurality of projecting lugs and a plurality of shoes engaged by said lugs and supported on the plate by a ball and socket connection which permits the shoes to tilt in all directions.

25. The combination of an oil well, a bearing ring dividing said well into annular chambers, a passageway connecting the chambers, and means for cooling the bearing ring to cool the oil as it is circulated around the ring.

26. In a bearing the combination of an oil well, a rotatable member, spaced bearing shoes thereon disposed in the oil well, a relatively stationary coöperating bearing member, and means for restricting the outward flow of oil, due to the rotation of the rotatable member therein, between the bearing members.

27. In a bearing the combination of an oil well, a rotatable member, spaced bearing shoes thereon disposed in the oil well, a relatively stationary coöperating bearing member, means for cooling one of the bearing members, and means for restricting the outward flow of oil between the bearing members.

28. In a thrust bearing the combination of relatively rotatable members, an oil well surrounding the said members, and means for restricting the flow of oil which is established through the bearing surfaces by the rotation of one of the bearing members.

29. In a thrust bearing the combination of relatively movable bearing members, an oil well surrounding the said members and adapted to maintain a bath of oil above the level of the bearing surfaces and a baffle plate placed in the said oil well and arranged to restrict the flow of oil that is established through the bearing surfaces by the relative movement of the bearing members.

30. A thrust bearing comprising relatively movable bearing members, an oil well inclosing the said members and adapted to maintain a bath of oil above the level of the bearing surfaces, means for permitting a restricted circulation of oil outwardly through the bearing surfaces when the bearing is in operation, and other means for permitting the return of the oil inwardly through one of the bearing members to the central portion of the oil well.

31. A thrust bearing comprising in combination relatively movable bearing members, means for cooling one of the said members and a baffle plate arranged to restrict the flow of oil which is established through the bearing surfaces when the latter are in relative movement.

32. In a thrust bearing construction the combination of two relatively rotatable members, an annular oil chamber inclosing the bearing members and extending above the level of the bearing surfaces, and means for establishing and maintaining a continuous restricted flow of oil outwardly through the bearing surfaces and inwardly through passageways below the level of said surfaces when the bearing is running.

33. In a bearing, the combination of an oil well, relatively rotatable bearing members therein, one of said members comprising a plurality of spaced bearing shoes, means for cooling one of the bearing members, and means for establishing and maintaining a continuous circulation of oil between the bearing members and around the cooled member.

34. In a bearing, the combination of an oil well, relatively rotatable bearing members therein, one of said members comprising a plurality of spaced bearing shoes, means for cooling one of the bearing members, means for establishing and maintaining a continuous circulation of oil between the bearing members and around the cooled member, and means for restricting the flow of oil between the bearing members.

In witness whereof, I have hereunto set my hand this 16th day of February, 1916.

ALBERT KINGSBURY.

Witness:
EMMA LEA MONTGOMERY.